United States Patent [19]

Zwillinger

[11] 4,070,076
[45] Jan. 24, 1978

[54] DRAWER SLIDING DEVICE
[75] Inventor: Daniel Zwillinger, New Boston, N.H.
[73] Assignee: The Raymond Lee Organization, Inc., New York, N.Y. ; a part interest
[21] Appl. No.: 794,087
[22] Filed: May 5, 1977
[51] Int. Cl.$^2$ .................. F16C 29/02; F16C 21/00
[52] U.S. Cl. .................. 312/350; 308/3.8; 312/341 R
[58] Field of Search ............... 312/340, 350, 348, 342, 312/345, 338; 308/3.6, 3.8

[56] References Cited
FOREIGN PATENT DOCUMENTS

| 119,472 | 9/1942 | Norway | 308/3.8 |
|---|---|---|---|
| 86,639 | 12/1955 | Norway | 308/3.6 |

Primary Examiner—Paul R. Gilliam
Assistant Examiner—A. Grosz
Attorney, Agent, or Firm—Daniel Jay Tick

[57] ABSTRACT

Each of a pair of drawer channel members is affixed to a correspondong side of a drawer having spaced opposite sides and opens outward toward a frame having a chamber therein accommodating the drawer and having spaced opposite sides, the sides being parallel. Each of a pair of frame channel members is affixed to a corresponding side of the frame in the chamber and opens inward toward the drawer and is positioned adjacent the corresponding drawer channel member. The channel members are positioned parallel. Each of a pair of extension bars is slidably positioned between a corresponding one of the drawer channel members and the adjacent frame channel member. Each of the channel members and each of the extension bars is shaped in a manner whereby each of the extension bars restrains, or is restrained by, the corresponding drawer channel member and frame channel member in sliding next-adjacent relation. Bores are formed through the extension bars. Rollers are rotatably mounted in the bores through the extension bars at predetermined angles of inclination with the sides of the drawer and the chamber of the frame. The rollers extend beyond the bars. Each of the rollers abuts and rolls on part of a drawer channel member and part of the corresponding frame channel member. The drawer and/or frame channel members may be tool-worked or molded right into position instead of constituting separate parts, or they may be provided with tabs, flanges, mounting holes, kerfs, grooves, or the like, for ease of assembly to said drawer and/or frame, and such assembly facilitating features may also serve as means to simplify and strengthen construction, assembly and fastening of elements of said drawer and frame. Furthermore, the drawer and frame relative sliding arrangement may be applied to any mechanically similar applicaton, not otherwise resembling exactly the features described herein.

15 Claims, 6 Drawing Figures

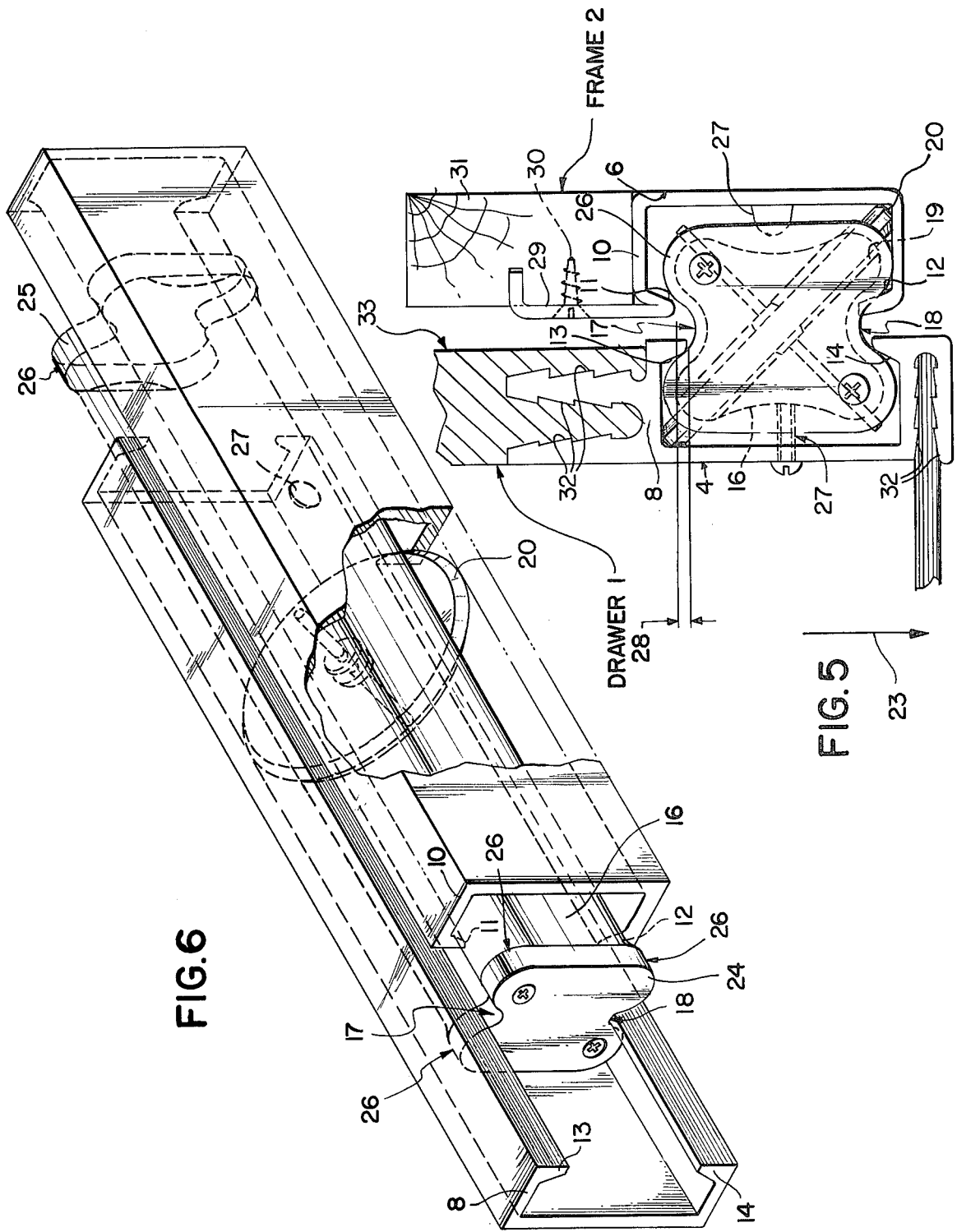

DRAWER SLIDING DEVICE

BACKGROUND OF THE INVENTION

The present invention relates to a drawer sliding device. More particularly, the invention relates to a drawer sliding device for selectively manually sliding a drawer into and out of a frame. The device of the invention relates to drawers, trays, gates, and any other extension bar supported devices.

As is well known, drawers of filing cabinets, kitchen cabinets and other furniture or related mechanical devices, destined to carry loads or articles relatively heavy, produce, when filled, a certain amount of friction against sliding open, which hampers their use. For this reason, they generally make use of guides and slides of various kinds, bearings, weight balances, and other devices. For the sake of simplicity, all these devices are hereinafter referred to as just "drawers".

Of the various kinds of known drawer slides, a common one is the slide extension which slides out half way for any distance that the drawer itself is pulled out to. This is, in general, accomplished in the following manner. The slide extension has rollers positioned at its center. The rollers contact with the drawer on one side and the cabinet frame on the other, in such a way that when the drawer is pulled out or pushed in, the rollers, and consequently the slide extension bar, moves just half the distance travelled by the drawer. Another condition that must be observed is that resistance to slippage must always be greater between the points of contact of the roller with the drawer and frame, rather than between the extension slide bar and the aforementioned drawer and cabinet parts, so that the roller cannot slip with respect to either one of them. In common designs, this feature is obtained by loading of the rollers. In a filing cabinet, for example, the whole weight of the drawer is supported by these rollers. However, as the drawer is moved, the weight center moves also, falling away from the position of the central rollers. In a common way, this difficulty is overcome by installing more than one set of rollers, so that at any position, at least one of them fulfills the above stipulated requirement.

Devices of the aforedescribed type, however, aside from increasing cost, are satisfactory primarily for steel drawer devices. Their application to, for example, common, wooden furniture is inconvenient from the standpoint of slide attachment precision requirements and the availability of limited choices of lengths of slides. The drawer sliding device of the invention may be applied as a separate added device to metal furniture, wood furniture, or plastic, equally well, or by incorporating the design directly into the fabricated shapes of the foregoing, since the concept is simple, adding little cost to the drawer devices.

The drawer sliding device of the invention, similarly to conventional devices, also travels half the distance travelled by the drawer of the device with respect to the cabinet frame. This is accomplished by a roller in contact with the fixed frame and the moving drawer part. The roller is supported by the slide extension bar. The contact between the roller and the other parts of drawer and cabinet are not, however, only due to planar loading, but are also as a consequence of torque along the slide extension bar, which guarantees the application of necessary contact.

Generally, the drawer sliding device of the invention comprises longitudinal bars or slide extensions that rest in grooves placed for the support of the drawer in the frame and, likewise, along the drawer. The shapes of the grooves are such as to permit a limited amount of torsion of the slide extension bar along them. At the center of the bars are located rollers that roll against the drawer at one point and the support frame for the drawer at an opposite point, and they rotate during the sliding of the drawer. The bars of each drawer may be singular for each drawer device or, more commonly, may be in pairs, as hereinafter described. The bars are restrained to alignment by specific guide features between such bars and corresponding positions along the channels. The bars of each drawer may eventually be connected between each other by linkages for better alignment, durability, performance and support.

The aforedescribed device in a general way offers a series of advantages, once the conditions that ensue from the fundamental principle of the invention are carried out.

The rollers are positioned in such a manner that during the entire projected traversal, during the entire relative motion between the different components of the drawer, the prescribed roller contact is always maintained, and applied loads will always produce the torsion of the extension bars of the slide applying tightness against the rollers. If, under certain conditions, this tightness is not always attainable, the rollers' own weight or certain spring-loading or similar mechanical means could also be used to supplement it.

At least one generally centrally located roller is mounted in each extension bar. Whenever the net force of the drawer loading is applied to the extension bar, the resulting torsion in said bar is always carried through to the rollers. Similarly, the change of position of the drawer causes no adverse effect. A greater number of rollers or bearing balls, or the like, may be used per slide, for greater versatility of the device. With this end in mind, it is also possible to have a larger number of pairs of contact points between rollers and both halves of a drawer assembly.

The friction between any portion of the two parts of the drawer assembly flange and frame and the slide or extension bar could also be eliminated or reduced by other friction reducing devices placed anywhere and in any position, similar to some other commonly known arrangements for slides, and so on. It is also possible to use to this end proper friction reducing devices or rollers for other typical functions of the device as well as other guides or other devices destined to augment proper functioning of the slides.

The practical design for the contact points between a central roller and the other parts of the drawer assembly must exhibit enough friction drag superior at least to any other drag that might exist elsewhere between the slide extension and parts in relative motion to it.

As hereinbefore mentioned, a drawer may be made with more than one slide assembly. Other types of guide methods may be applied together with the slides at hand. The forms of such additional guides and slides must be such as never to obstruct the necessary freedom for torsion of the bars at hand. The direction of the required torsion axis in a bar can also be so chosen as to control the amount of clearance among the components of the slide assembly, in general, or for a particular slide position.

It is further possible to apply to the invention a multiplicity form, by making simultaneous use of several of the described extension bars or slides, one operating inside the other, in order to obtain greater extension between the support components of the drawer.

Another feature of the invention is that it can have front to back symmetry and thus operate equally forward as to the rear. This capability can be utilized so that a given length slide, installed near the forward end of a drawer can service a drawer twice its nominal length, by extending inward when the drawer is closed.

The rollers may also not be required to support the entire loading applied between the support components of the drawer, so that the torsion applied need not apply excessive strain to the axles of the rollers, especially if the extension bars are made of fibrous or plastic materials.

Objects of the invention are to provide a drawer sliding device of simple structure, which is inexpensive in manufacture, parts of which are readily fabricated as integral features of the drawer or frame, or which can incorporate assembly aids to improve and accelerate that process, and functions efficiently, effectively and reliably to provide good, low friction, sliding support for a drawer. The drawer sliding device of the invention has the advantages of low demand on tight tolerances for assembly and operation, severability to a desired length with a hacksaw, or similar tool, for do-it-yourself, versatility and handyman applications, extendability in either of two opposite end directions, removability of the drawer with or without releases, adaptability of adjustable or fixed drawer stops, and applicability to a multitude of different applications.

BRIEF SUMMARY OF THE INVENTION

Longitudinal extension bars are placed in channel members along the surfaces of the interior of the lateral drawer support frame and along the exterior surfaces of the drawer sides, corresponding to the former. Rollers are rotatably mounted in the extension bars via fixed axles in the bars. The rollers travel along the lateral support frame of the drawer from one side and along the sides of the drawer from the other side, and, in this way they move together with the extension bars over a fraction of the distance of the separation between the two, the drawer and the frame. The fraction is established by the ratio of the distances between the roller axles and the points of contact of the rollers with the drawer assembly to the total separation. The points of contact of the rollers with the parts of the drawer are maintained by the loading applied to the rollers as a consequence of transverse torsion along the extension bars, proportional to the loading of the drawer and thus also proportional to other friction drag present within the device, since the torsion is also a direct product of the loading of the drawer. Furthermore, the force applied at any point along the extent of the extension bars by such loading is always transmitted to the rollers and thence distributed to the points of contact between the rollers and the drawer and frame.

Ramps are provided at the top ends of the extension bars to promote drawer and frame alignment at specified positions, without the sacrifice of otherwise loose tolerance conditions, and also to facilitate the introduction of stops for some specific positions. The ramps may be provided by the addition of caps to the ends of the bars. The caps consist of low friction material and may be attached after the bars have been cut to desired lengths. The assembly aid features are hereinafter represented.

BRIEF DESCRIPTION OF THE DRAWINGS:

In order that the invention may be readily carried into effect, it will now be described with reference to the accompanying drawings, wherein:

FIG. 5 is a view, on an enlarged scale, of an embodiment of an extension bar and its corresponding channel members of the drawer sliding device of the invention, also showing assembly aids; and FIG. 6 is a perspective view, on an enlarged scale, of the embodiment of the extension bar and channel members of FIG. 5, and showing front to back symmetry.

DETAILED DESCRIPTION OF THE INVENTION

Figure 1:
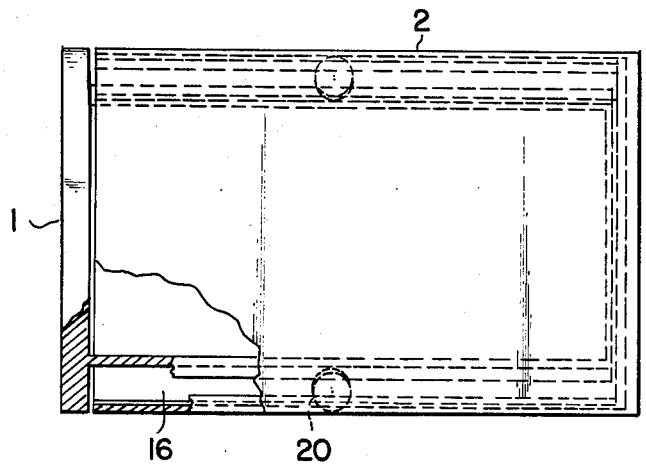
FIG. 1 is a top view, partly cutaway and partly in section, of an embodiment of the drawer sliding device of the invention, with the drawer closed.
Figure 2:
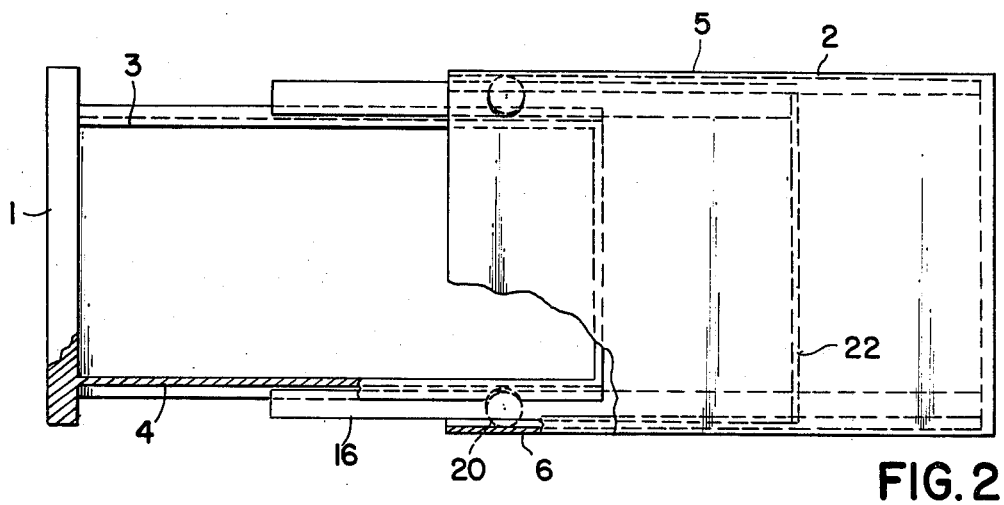
FIG. 2 is a top view, partly cutaway and partly in section, of the embodiment of FIG. 1, with the drawer open.
Figure 3:
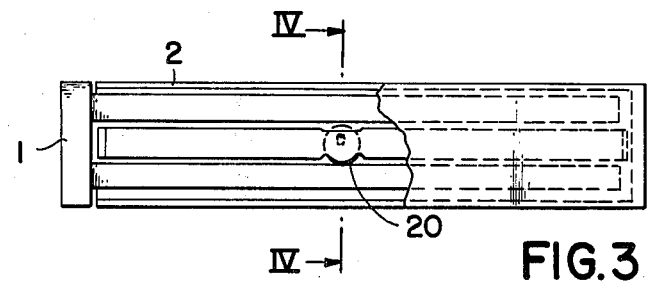
FIG. 3 is a side view, partly cutaway and partly in section, of the embodiment of FIG. 1.
Figure 4:
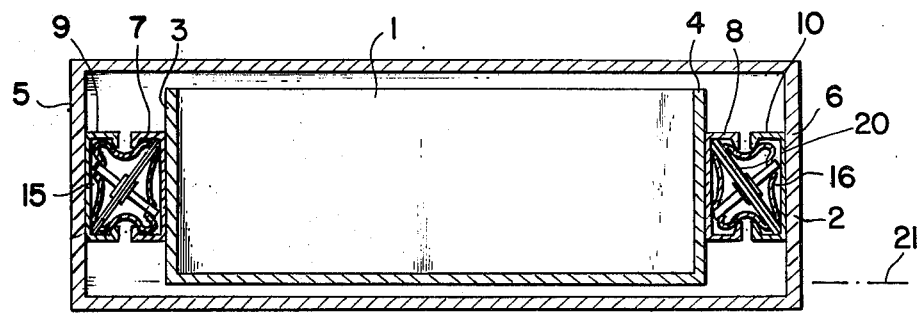
FIG. 4 is a cross-sectional view, taken along the lines IV—IV, of FIG. 3.

The drawer sliding device of the invention selectively manually slides a drawer 1 (FIGS. 1, 2, 3, 4 and 5) into and out of a frame 2 (FIGS. 1 to 5). The drawer 1 has spaced opposite sides 3 and 4 (FIGS. 2 and 4). The frame 2 has a chamber therein accommodating the drawer and having spaced opposite sides 5 and 6 (FIGS. 2 and 4). The sides 3, 4, 5 and 6 are parallel.

A pair of drawer channel members 7 and 8 are provided. The drawer channel member 7 is affixed to the side 3 of the drawer 1 and extends longitudinally therein and opens outward toward the side 5 of the frame 2 (FIGS. 4 to 6). The drawer channel member 8 is affixed to the side 4 of the drawer 1 and opens outward toward the side 6 of the frame 2 (FIG. 4).

A pair of frame channel members 9 and 10 are provided. The frame channel member 9 is affixed to the side 5 of the frame 2 in the chamber and opens inward toward the drawer 1 (FIGS. 4 to 6). The frame channel member 10 is affixed to the side 6 of the frame 2 in the chamber and opens inward toward the drawer 1 (FIG. 4). The frame channel member 9 is positioned adjacent the drawer channel member 7 and the frame channel member 10 is positioned adjacent the drawer channel member 8, as shown in FIG. 4. The channel members 7, 8, 9 and 10 are positioned in parallel.

Each of the channel members, as shown in FIGS. 4 to 6, is of substantially C-shaped configuration with free arm ends extending toward each other. Thus, as shown in FIGS. 5 and 6, the drawer channel member 7 has a pair of free arm ends 11 and 12 extending toward each other and the frame channel member 9 has a pair of free arm ends 13 and 14 extending toward each other.

A pair of extension bars 15 and 16 are provided (FIG. 4). The extension bar 15 is slidably positioned between the drawer channel member 7 and the frame channel member 9 and the extension bar 16 is slidably positioned between the drawer channel member 8 and the frame channel member 10. Each of the extension bars 15 and 16, of which the extension bar 16 is shown in FIGS. 5 and 6, is shaped in a manner whereby it restrains the corresponding drawer channel member and frame channel member in sliding next-adjacent relation. Thus, as shown in FIGS. 5 and 6, the extension bar 16 has a pair of rounded notches 17 and 18 in 180° opposition for accommodating the free arm ends 11 and 12 of the drawer channel member 10 and the free arm ends 13 and 14 of the frame channel member 8. An optional linkage 22, shown in broken lines in FIG. 2, connects the two extension bars.

Bores such as, for example, the bore 19 shown in FIG. 5, are formed through the extension bars 15 and 16. There is at least one bore formed in each of the extension bars 15 and 16. The bores, with rollers, as hereinafter described, may be used, for example, to replace the optional end caps 24 and 25 (FIGS. 5 and 6).

A roller is rotatably mounted in each of the bores through the extension bars at predetermined angles of inclination with the sides of the drawer and the chamber of the frame, as shown in FIGS. 5 and 6 which illustrate a single roller 20. The rollers extend beyond the extension bars, and each of the rollers abuts and rolls on part of a drawer channel member and part of the corresponding frame channel member. Thus, as shown in FIG. 5, the roller 20 abuts and rolls along the upper inside corner of the drawer channel chamber 8 and the lower outside corner of the frame channel member 10.

Each of the rollers is mounted in the extension bars 15 or 16, in the bar 16 at a preferable angle of inclination of approximately 135° with the plane 21 of the bottom of the drawer 1 (FIG. 4), and in the bar 15 at a preferable angle of inclination of approximately 45° with the plane 21.

The rollers are preferably covered with any suitable material having a high coefficient of friction, such as, rubber, or the like, around their rims. The applied load causes a specific torsion of the extension bars 15 and 16 due to the weight and loading of the drawer, thereby always maintaining at least partial support of the drawer 1 via the points of contact of the rollers. Under such conditions, when the drawer 1 is pulled out, the rollers roll along the drawer and frame channel members and the extension bars are extended inward from the cabinet frame 2, partially into the drawer 1, to maintain the support of the drawer. The arrow 23 of FIG. 5 indicates the direction of loading or gravity.

For the operation of the drawer, shown on the drawing in a horizontal position, only the two points of contact of the rollers are sufficient. But in order for the drawer to function in other initial positions, inclined, vertical or upside down, four contact points become necessary, for all the rollers of an entire slide, considering the optional rollers, as well. In the case of upside-down position, it is necessary to provide substantial resiliency in the optional rims of the rollers for adequate operation of the drawer, but this is not a recommended application of the device.

If the drawer is in suspense, so as not to apply any loading onto the rollers, the required contact of same is still assured by the proper weight of just the extension bars, or by the optional elastic expansion of the device, rollers, or the material with which the rollers may be covered. Since the rollers are placed at points of maximum friction between the extension bars and the channel members, which would be the case if rollers were absent, such friction is considerably reduced by the rollers. The net drag from resistance to motion caused by friction, at other points where no rollers are used, is furthermore cancelled, or balanced out, due to the duality of directions of the contact points, which exist in pairs, according to the principles of statics applicable hereto. The contact pressure of the rollers is proportional to the loading of the drawer to which the friction at other points encountered by the extension bars is also proportional.

Slide stops 27 of any suitable design and type, fixed and/or removable, extend from the drawer and frame channel members, as shown in FIGS. 5 and 6, and are preferably utilized to limit the movement of the extension bars out of the frame beyond a predetermined point.

The end caps 24 and 25 function as friction reducing devices, which are removable for cutting the slide parts to length and to provide ramps 26, which align the drawer and frame in closed position with little imposition on tolerance requirements and without impairing the required contact pressure on the control rollers when the slide is not in its initial position.

Tolerance 28, shown in FIG. 5, guarantees roller contact despite inaccurate assembly, compression of pliable rollers, wear of parts, and so on.

Some of the infinitely many assembly aid features are shown in FIG. 5. A mounting flange 29, with a screw 30, is fastened into the frame-cleat 31. Kerfed grooves 32 are provided, onto which the drawer side 33 is attached, or into which a sheet of press-board 34 is installed, to become the drawer bottom.

While the invention has been described by means of a specific example and in a specific embodiment, I do not wish to be limited thereto, for obvious modifications will occur to those skilled in the art without departing from the spirit and scope of the invention.

I claim:

1. A sliding device for selectively sliding a member into and out of a support, said member having spaced opposite sides and said support having a chamber therein accommodating said member and having spaced opposite sides, said sides being parallel, said member sliding device comprising
   a pair of member channel members each affixed to a corresponding side of the member and opening outward toward the support;
   a pair of support channel members each affixed to a corresponding side of the support in the chamber and opening inward toward the member and positioned adjacent the corresponding member channel member, said channel members being positioned in parallel;
   a pair of extension bars each slidably positioned between a corresponding one of the member channel members and the adjacent support channel member, each of the channel members and each of the extension bars being shaped in a manner whereby each of said extension bars restrains the corresponding member channel member and support channel member in sliding next-adjacent relation;
   bores formed through the extension bars; and
   rollers rotatably mounted in the bores through the extension bars at predetermined angles of inclination with the sides of the member and the chamber of the support, said rollers extending beyond said bars, and each of said rollers abutting and rolling on part of a member channel member and part of the corresponding support channel member.

2. A sliding device as claimed in claim 1, wherein each of the channel members is of substantially C-shaped configuration with free arm ends extending toward each other and each of the extension bars has a pair of rounded notches in approximately 180° opposition for accommodating said free arm ends.

3. A sliding device as claimed in claim 1, wherein each of the rollers mounted in one of the extension bars is approximately centrally positioned therein and is inclined at approximately 45° with the plane of the bottom of the member and each of the rollers mounted in the other of the extension bars is inclined at approximately 135° with said plane.

4. A sliding device as claimed in claim 1, wherein the member sliding into and out of the support comprises a utility device.

5. A sliding device as claimed in claim 1, wherein the inner sliding member becomes the support and the outer support slides.

6. A sliding device as claimed in claim 1, wherein only one half of the device comprising one of the two opposite sides is utilized, with a conventional approach used opposite it.

7. A sliding device as claimed in claim 1, wherein more than two halves of the device comprising one of the two opposite sides are utilized.

8. A sliding device as claimed in claim 1, comprising a plurality of slides built into each other so that a support of one becomes the member of the other.

9. A sliding device as claimed in claim 1, wherein the member channel members are an integral part of the member and the support channel members are an integral part of the support.

10. A sliding device as claimed in claim 1, further comprising end caps of slightly altered cross-section as that of the extension bar at the ends of the extension bars.

11. A sliding device as claimed in claim 10, further comprising stops extending from the member and support channel members and engaging against the caps for limiting the movement of the extension bars out of the support beyond a predetermined point.

12. A sliding device as claimed in claim 10, to provide the means whereby each said bar is severable to a desired length, with subsequent cap placement.

13. A sliding device as claimed in claim 10, further comprising a specific shape of the end caps for promoting alignment of the member and the support.

14. A sliding device as claimed in claim 13, further comprising ramps on the end caps for promoting smooth transition between tighter and looser alignment positions along the sliding course of the device.

15. A sliding device as claimed in claim 1, further comprising assembly aids as integral features.

* * * * *